UNITED STATES PATENT OFFICE.

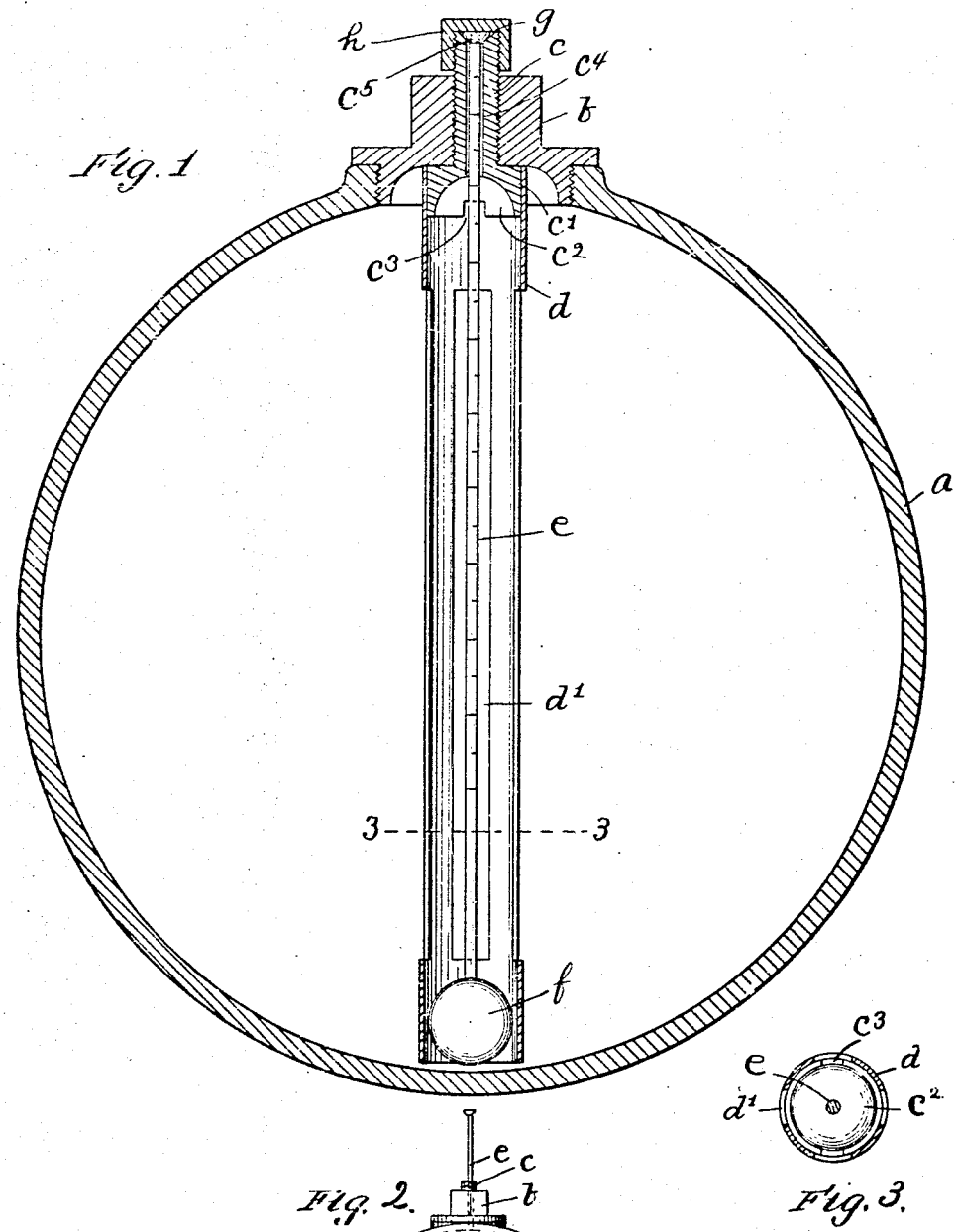

JOHN R. SMITH, OF BRADFORD, MASSACHUSETTS, ASSIGNOR TO ROBERT A. JORDAN, TRUSTEE, OF BROOKLINE, MASSACHUSETTS.

TANK-INDICATOR.

956,907.  Specification of Letters Patent.  Patented May 3, 1910.

Application filed October 14, 1908. Serial No. 457,615.

*To all whom it may concern:*

Be it known that I, JOHN R. SMITH, of Bradford, county of Essex, State of Massachusetts, have invented an Improvement in Tank-Indicators, of which the following is a specification.

This invention particularly relates to a device for indicating the depth of liquid in the gasolene tanks of automobiles or motor-boats, and has for its principal object the provision of an indicating device which may be readily applied to the cap of the filling opening of any tank, so that the formation of additional openings through the walls of the tank is rendered unnecessary, and which is simple in construction, so that it may be applied at small expense. I accomplish this object by the means shown in the accompanying drawing, in which, Figure 1 is a central sectional view of a tank provided with my invention. Fig. 2 is an elevation thereof, and Fig. 3 is a cross section looking up on the line 3—3 of Fig. 1.

My invention is shown as applied to a tank $a$, of any form, which is provided with a screw cap $b$, through which the tank may be filled. According to my invention the screw cap $b$ is provided with a central bore, into which a screw plug $c$ is threaded, said plug having a head $c'$ which is adapted to seat against the inner side of the cap, so that, when the plug is screwed in place, leakage between the cap and plug will be prevented. Said head $c'$ is preferably provided with a recess $c^2$ in the end thereof, and with oppositely disposed notches $c^3$ adjacent its periphery, so that the plug may be screwed into place, conveniently, with a suitable tool.

A guide tube $d$ is fitted on the head $c'$ and rigidly secured thereto by any suitable means, said guide tube being adapted to extend adjacent the bottom of the tank, when the cap $b$ is in place, and being provided with a series of longitudinal slots $d'$ to permit free flow of the liquid to and from the same. The plug $c$ is provided with a central bore $c^4$ in which an indicator rod $e$ is fitted to slide freely, said rod having a float $f$, of cork or other suitable material, secured to the lower end thereof. A head or nut $g$, which is of somewhat greater diameter than the rod $e$, is adapted to be threaded onto the upper end of said rod, to prevent the rod from being withdrawn from said plug.

The length of the threaded portion of the plug $c$ is somewhat greater than the thickness of the cap $b$, so that, when said plug is screwed in place, its end will protrude for a short distance above the upper or outer surface of the cap, and a supplemental cap or cup $h$ is provided, which is adapted to be threaded onto the protruding end of said plug, so that when it is screwed in place it will tightly close the upper end of the bore $c^4$, the upper end of the plug $c$ being provided with a recess $c^5$ to receive the nut $g$, so that the bottom of the cap $h$ may be seated against the end of the plug.

Normally the parts will be held in the position shown in Fig. 1, whether the tank is full or empty, the cup $h$ holding the float $f$ submerged. If, however, it is desired to ascertain the depth of liquid in the tank, the cup $h$ is merely unscrewed, liberating the rod $e$, so that the float $f$ may rise to the surface and lift the rod to a height corresponding to the depth of the liquid in the tank, said rod $e$ being provided with graduations to indicate the depth of the liquid, as will be obvious. After the depth of the liquid has been ascertained the rod is pushed down in place and the cup $h$ is screwed onto the plug again.

The longitudinal slots $d'$ are extended nearly the entire length of the guide tube $d$ for the special purpose of permitting free escape of the liquid from the tube above the float, as the latter is permitted to rise, for, if such means of escape were not provided, the liquid would be thrown or forced out through the bore $c^4$ by the float as it is pressed up by the liquid.

If it is desired to fill the tank the cap $b$ is unscrewed and the whole apparatus attached thereto is removed.

Having thus described my invention, what I claim as new and desire to secure by Letters Patent is:—

1. In combination with a removable tank-closure having a passage therethrough, an indicator-rod mounted to slide in said passage, and having a float thereon of less diameter than the closure and means for limiting the movement of said rod with relation to said closure to prevent disconnection thereof when the closure is removed from the tank, substantially as described.

2. In combination with a removable tank-closure having a passage therethrough, a float-indicator-rod mounted to slide in said passage, means for closing said passage and holding said rod in depressed position, and means for limiting the movement of said rod with relation to said closure to prevent disconnection thereof when the closure is removed from the tank, substantially as described.

3. In combination with a removable tank-closure having a passage therethrough, an indicator-rod mounted to slide in said passage, and having a float thereon of less diameter than the closure and means for limiting the movement of said rod in said passage to prevent withdrawal of the rod from said passage when the closure is removed from the tank, substantially as described.

4. In combination with a removable tank-closure having a passage therethrough, an indicator-rod mounted to slide in said passage and having a retaining head at its outer end, and a float at its inner end of less diameter than the closure, substantially as described.

5. In combination with a tank-closure having a threaded aperture therethrough, and having a screw plug threaded in said aperture provided with a head at its inner end and a longitudinal bore, an indicator-rod mounted to slide in said bore, and a guiding device for said float connected to said head, substantially as described.

6. In combination with a tank-closure having a plug extending therethrough, said plug having a longitudinal bore, a float-indicator-rod mounted to slide in said bore, and a cap adapted to be threaded on the outer end of said plug to close said bore and hold said rod in depressed position, substantially as described.

In testimony whereof, I have signed my name to this specification, in the presence of two subscribing witnesses.

JOHN R. SMITH.

Witnesses:
L. H. HARRIMAN,
H. B. DAVIS.